US009102278B2

(12) United States Patent
Dauphinee

(10) Patent No.: US 9,102,278 B2
(45) Date of Patent: Aug. 11, 2015

(54) LEFT AND RIGHT SIDE VIEW MIRRORS

(71) Applicant: Thomas M. Dauphinee, Toronto (CA)

(72) Inventor: Thomas M. Dauphinee, Toronto (CA)

( * ) Notice: Subject to any disclaimer, the term of this patent is extended or adjusted under 35 U.S.C. 154(b) by 0 days.

(21) Appl. No.: 13/998,283

(22) Filed: Oct. 18, 2013

(65) Prior Publication Data

US 2014/0233122 A1    Aug. 21, 2014

Related U.S. Application Data

(60) Provisional application No. 61/850,613, filed on Feb. 20, 2013.

(51) Int. Cl.
*B60R 1/08* (2006.01)
*B60Q 1/48* (2006.01)
*B60R 1/06* (2006.01)

(52) U.S. Cl.
CPC . *B60R 1/081* (2013.01); *B60Q 1/48* (2013.01); *B60R 1/06* (2013.01)

(58) Field of Classification Search
USPC .......................................................... 296/1.11
See application file for complete search history.

(56) References Cited

U.S. PATENT DOCUMENTS

| | | | | |
|---|---|---|---|---|
| 3,628,851 | A * | 12/1971 | Robertson | 359/868 |
| 4,245,894 | A * | 1/1981 | Luchtenberg | 359/866 |
| 4,482,210 | A * | 11/1984 | Brookman | 359/872 |
| 4,907,871 | A * | 3/1990 | Hou | 359/841 |
| 5,579,133 | A * | 11/1996 | Black et al. | 359/866 |
| 6,522,451 | B1 * | 2/2003 | Lynam | 359/265 |
| 6,932,483 | B2 * | 8/2005 | Strumolo et al. | 359/864 |
| 2003/0039039 | A1 * | 2/2003 | Thomas et al. | 359/865 |
| 2007/0058276 | A1 * | 3/2007 | Behbehani | 359/883 |
| 2009/0273208 | A1 * | 11/2009 | Ballard | 296/201 |
| 2010/0177413 | A1 * | 7/2010 | Lee et al. | 359/843 |

FOREIGN PATENT DOCUMENTS

WO   WO2013110116 A1 *  8/2013  ............... G60Q 1/48

* cited by examiner

*Primary Examiner* — Charlie Y Peng

(57) ABSTRACT

Left and Right side view mirrors for a vehicle giving the driver a view outwardly to each side of the vehicle, to check lanes on each side, to ensure safe lane changes.

5 Claims, 3 Drawing Sheets

LEFT AND RIGHT SIDE VIEW MIRRORS

This application is based on U.S. Provisional Application No. 61/850,613 Filed Feb. 20, 2013; Inventor: Thomas M. Dauphinee; Title: Left and Right Side View Mirrors, the priority of which is claimed.

FIELD OF THE INVENTION

The invention relates to side view mirrors for a vehicle, and in particular to a pair of left and right side view mirrors giving the driver a view outwardly to each side of the vehicle, to check lanes on each side, and to ensure safe lane changes.

BACKGROUND OF THE INVENTION

When making a lane change, especially on a highway with multiple lanes, it is necessary for the driver to ensure that there is no other vehicle, in an adjacent lane. Various proposals have been made in the past for mirrors providing all round view, from the centre of the driving compartment. However these mirrors are not totally effective to provide a view of vehicles which may be in an adjacent side lane, either to the left or to the right. In addition, these centre view mirrors involve modifying the interior of the car substantially to remove the existing rear view mirror and replace it with some more complex structure, in addition, the costs of such all round mirrors have been a factor detracting from their appeal.

Clearly it is desirable to provide some form of effective side view mirrors which are both economical to manufacture and which can easily be installed by the driver of the vehicle, and most importantly provide a means of monitoring the presence of vehicles in lanes on either side, which would otherwise require a twisting movement of the head to check.

BRIEF DESCRIPTION OF THE INVENTION

A left side mirror is located near the top of the left side of the windshield with the right hand edge in front the driver. A right side mirror is located near the top of the right side of the windshield with its left hand edge in front of the front seat passenger. For simplicity, the mirrors may be suction cup mounted on pivot bases. The mirrors are adjustable in the same way that the centre rear view mirror is adjusted, ie. They can be rotated at angles and tilted down.

A black line is located across the top of each mirror sloping at an angle.

A further black line is located along the top of each mirror, parallel to the top edge, and a further black line is located along the right hand vertical edge of the left side mirror and along the left hand vertical edge of the right side mirror, for reasons to be described below.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
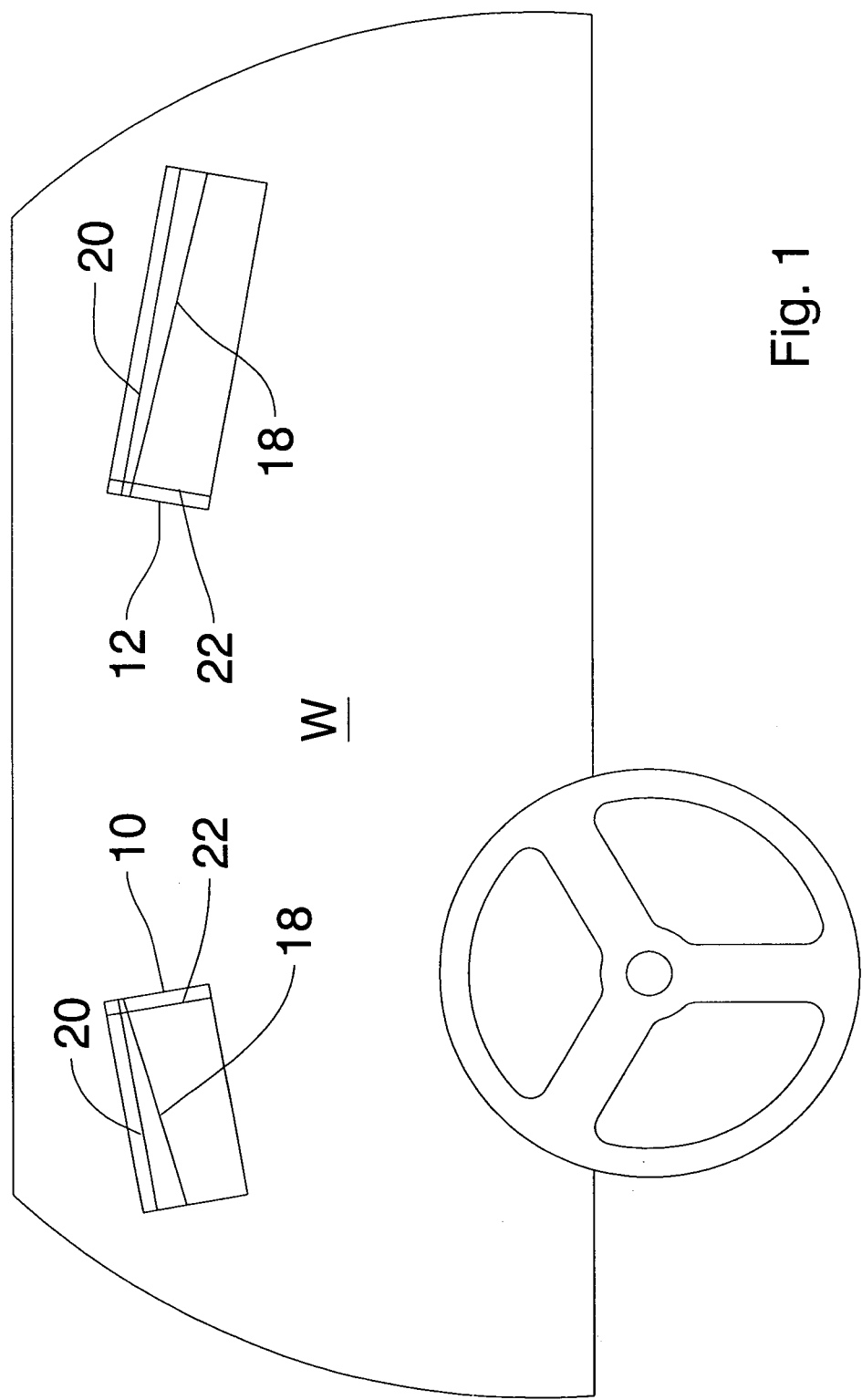
FIG. 1 is an elevation of a car interior illustrating the left and right side view mirrors, of the invention.

As noted above the invention provides two separate mirrors, namely a left side mirror (10) and a right side mirror (12). In this example, each of the mirrors are mounted on a suction cup base (14) (FIG. 1) and provided with a typical ball joint or swivel mount (16) located on left and right sides of a windshield (W), similar to the usual rear view mirror.

Figure 2:
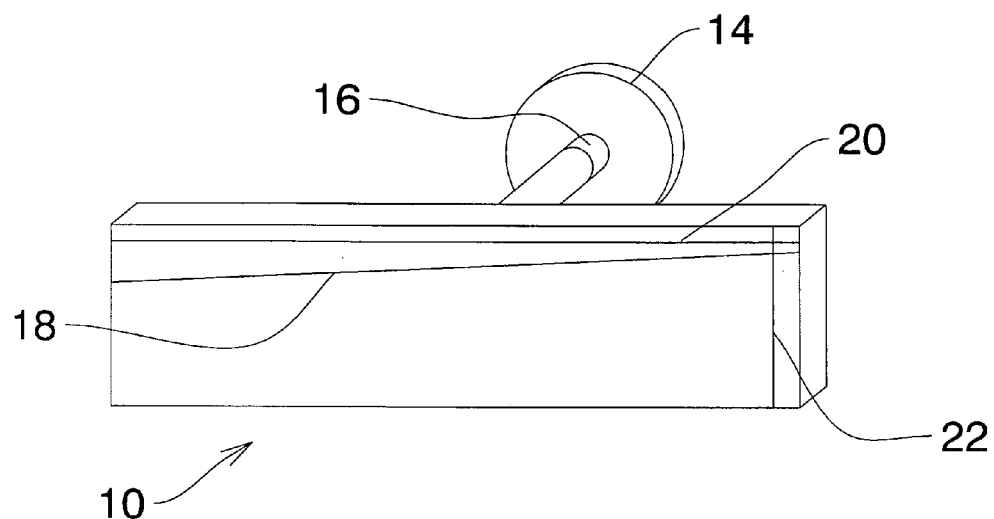
FIGS. 2 and 3 show the proportions of the left and right side view mirrors.
Figure 3:
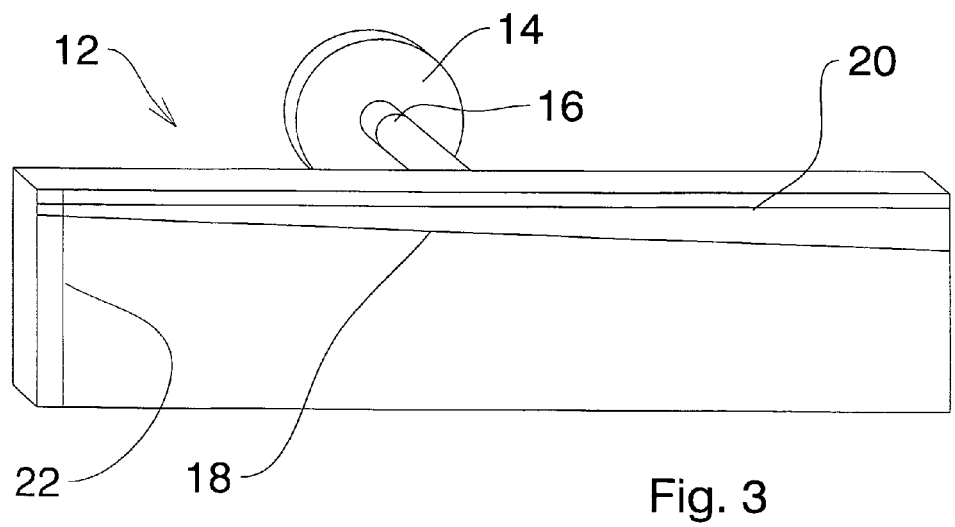
Figure 4:
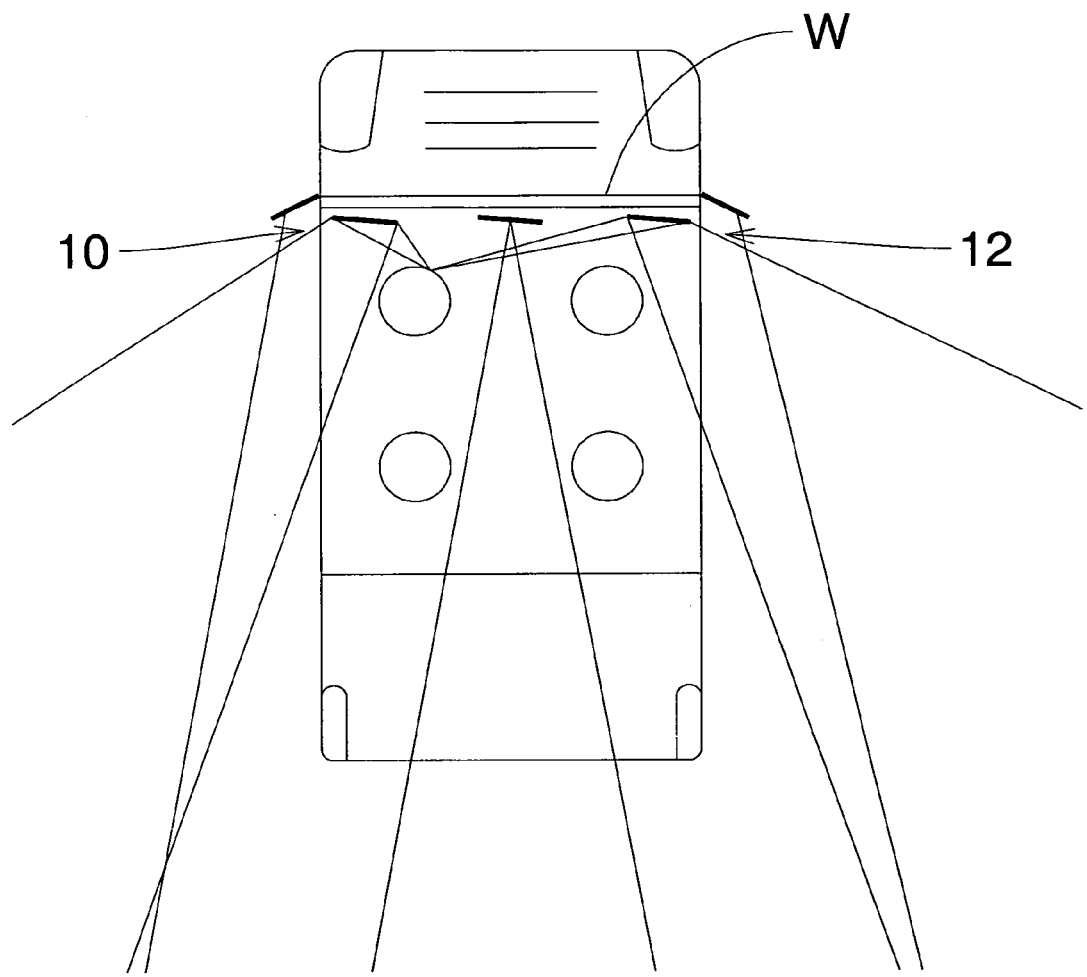
FIG. 4 is a schematic illustration showing the lines of sight of the driver, available to the driver, using the left and right side mirrors.

The left side mirror is smaller and the right side mirror is larger. As shown in FIGS. 2 and 3, each mirror is a single panel of planar mirror glass, each being elongated and of a relatively reduced height. Preferably the left and right mirrors will have proportions between the length and the height of between 5-to 1 and 6 to 1. Preferably the left side mirror will define somewhere about 70-90 sq. cm., and the right side mirror will define somewhere between about 140-160 sq. cm.

The proportion between the two mirrors is somewhere in the region of the right side mirror area being between about 90-110 percent larger than the area of the left side mirror. In the embodiment illustrated, a 20 cm×4 cm (approx.) left side mirror (10) is located near the left side of the top of the windshield (W) with the right hand mirror edge in front the driver. A 30 cm×5 cm approx. right side mirror (12) is located near the top of the right side of the windshield with its left hand mirror edge in front of the front seat passenger. In this example, the mirrors are suction cup mounted on pivot bases (14) and are adjustable in the same way that the usual centre rear view mirror is adjusted.

While suction cups are particularly suitable for sale of mirrors in the automobile after market, it is of course possible that such side view mirrors will be adopted by one or more manufacturers in which case they would be attached by the usual adhesive or other methods, such as in use for the attachment of the centre rear view mirrors.

A black line (18) is located near the top of each mirror running from 4 mm down from the upper edge at the inner end to 16 mm down at the outer edge on the driver side left mirror (10) and 6 mm to 24 mm on the passenger side right mirror (12).

An upper edge black line (20) is located along the top edge of each mirror, parallel to the top edge of the mirror, and spaced downwardly two or three millimeters.

A side edge black line (22) is located on each mirror. Line (22) on the left side mirror (10) being located parallel to and spaced inwardly from the right hand edge of the left side mirror, and the black line (22) on the right side mirror being spaced adjacent to and inwardly from the left hand vertical edge of the right side mirror.

The purposes of the lines (20) and (22) is to provide the driver with an indication that either a vehicle is possibly approaching and presenting a possible lane change hazard. In the alternative, when a vehicle in an adjacent lane moves over the sloping line (18) or past the vertical black line (22) it indicates that a lane change can be made safely. The driver side left mirror (10) is adjusted so that the driver can just see the back post of the driver side rear door on the right side of that mirror. The field of view will include a substantial area to the left of the car. The passenger side right mirror (12) is adjusted so that the driver can just see the back post of the passenger side rear door on the left side of that mirror. The field of view will include a substantial area to the right of the car. Both mirrors are adjusted and tilted in such a way that the black line (18) on the mirror lies on the image of the lane marking line on the far side of the adjacent lane. The top of the mirror will then correspond to about 1.5 m beyond that line.

All mirror adjustments should be made with one eye closed, right eye closed for the drivers side mirror and left eye for the passenger side.

A vehicle in the adjacent lane will fill the mirror from top to bottom. Once set, most drivers will be able, in most cases, to use the mirrors without further adjustment and without eye closure. With eye closure, the lowest parts of the wheels of a vehicle in the next lane will normally be visible above black line (18) on the mirror. If they are not above blackline (18), the car is encroaching into the adjacent lane and no lane change should be attempted.

The lowest parts of the wheels of a vehicle in the next lane over may be visible at the top of the mirror.

On both sides of the car, the driver can see in the appropriate mirror or in the front door window or the windshield, at least part of any vehicle in a position such that he/she should not move into that vehicle's lane. A shoulder check, which is inconvenient (and nearly impossible for people with limited head motion) is no longer required.

Alternatively, if the top edge of the mirror is located on the image of the far side lane marking, no part of the next lane will be visible in the mirror with eye closure. However, there is an advantage to seeing the lower parts of vehicles in the far lane, as a warning that they could be about to move over.

When passing another vehicle on either side, that vehicle will be seen first through the windshield, then through the front door window, and, while still in view in the front door window will appear at the outer edge of the side-view mirror and will progress across the mirror to the inner edge and finally out of view. At this "safe point" it is safe to move over into that vehicle's lane with several car lengths (depending on lane width and location in the lanes) safety margin between the two cars. In city driving at low speed, the safe point occurs after the car falls behind black line (22).

The driver side mirror (10) is smaller for the same width of view because the eye-to-mirror distance is less. There is no reduction of image size on either side.

Deviations from the settings of the mirrors as described to suit personal preferences will not seriously affect performance. Using suction cup mountings near the top of the windshield, the mirrors can be installed in a few minutes.

As mentioned above, the use of suction cup mountings is particularly suitable for the automotive after market. However if the mirrors are adopted by an automobile manufacturer, it is in all likely that the side view mirrors (10 and 12) will be attached by the usual permanent adhesive such as is used for attaching the centre rear view mirror at the present time.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A pair of left and right side view mirrors for a vehicle and comprising:
    a left side view planar mirror for a vehicle giving a driver a view outwardly to the left of the vehicle to check adjacent left lanes;
    a right side view planar mirror for the vehicle giving the driver a view outwardly on the right side of the vehicle to check adjacent right lanes;
    each of said left and right side view planar mirrors defining an upper edge and two side edges;
    a first diagonal line across said left side view planar mirror extending from the right side edge of the left side view planar mirror to the left side edge at a downward angle on said left side view planar mirror;
    a second diagonal line across said right side view planar mirror extending from the left side edge of the right side view planar mirror at a downward angle towards the right side edge of the right side view planar mirror;
    an upper edge line on the right side view planar mirror extending parallel to the upper edge of said right side view planar mirror and a further upper edge line on the left side view planar mirror extending parallel to the upper edge of said left side view planar mirror; and
    a mounting device for the left side view planar mirror and a separate mounting device for the right side view planar mirror, mounting the respective mirrors on the left and right hand sides of a windshield of the vehicle, the mounting devices permitting rotation and tilting of each said mirror to enable viewing of the left and right hand adjacent lanes respectively, thereby enabling safe lane changes.

2. The pair of side view mirrors for the vehicle as claimed in claim 1 and including a right hand edge line on said left side view planar mirror extending parallel to the right side edge of said left side view planar mirror, and a left hand edge line on said right side view planar mirror extending parallel to said left side edge of said right side view planar mirror.

3. The pair of side view planar mirrors for the vehicle as claimed in claim 2 wherein said left side view planar mirror has a predetermined cross sectional area and wherein said right side view planar mirror has a cross sectional area between 90% and 100% greater than said left side view mirror.

4. The pair of side view planar mirrors for the vehicle as claimed in claim 3 wherein said left side view planar mirror and said right side view planar mirror are of rectangular shape, and wherein each defines longer length and shorter height.

5. The pair of side view planar mirrors for the vehicle as claimed in claim 4 wherein the proportions between the length and height of each said side view planar mirror are between 5:1 and 6:1.

* * * * *